(12) United States Patent
Wright et al.

(10) Patent No.: US 11,057,427 B2
(45) Date of Patent: *Jul. 6, 2021

(54) METHOD FOR IDENTIFYING PHISHING WEBSITES AND HINDERING ASSOCIATED ACTIVITY

(71) Applicant: CISCO TECHNOLOGY, INC., San Jose, CA (US)

(72) Inventors: Jordan Wright, Ann Arbor, MI (US); Jon Oberheide, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,935

(22) Filed: Oct. 31, 2019

(65) Prior Publication Data

US 2020/0067979 A1 Feb. 27, 2020

Related U.S. Application Data

(63) Continuation of application No. 15/683,358, filed on Aug. 22, 2017, now Pat. No. 10,498,761.

(60) Provisional application No. 62/378,551, filed on Aug. 23, 2016.

(51) Int. Cl.
*H04L 29/06* (2006.01)

(52) U.S. Cl.
CPC ...... *H04L 63/1483* (2013.01); *H04L 63/1416* (2013.01); *H04L 63/1425* (2013.01); *H04L 63/168* (2013.01)

(58) Field of Classification Search
None
See application file for complete search history.

(56) References Cited

U.S. PATENT DOCUMENTS

| | | |
|---|---|---|
| 7,841,003 B1 | 11/2010 | Emdee |
| 7,945,956 B2 | 5/2011 | Mody et al. |
| 8,707,426 B1 | 4/2014 | Ramzan et al. |
| 8,839,369 B1 | 9/2014 | Dai et al. |
| 9,065,850 B1 | 6/2015 | Sobrier |
| 9,769,184 B2 | 9/2017 | Smith et al. |
| 10,498,761 B2 * | 12/2019 | Wright ............... H04L 63/1425 |
| 2007/0240217 A1 | 10/2007 | Tuvell et al. |
| 2009/0144308 A1 | 6/2009 | Huie et al. |
| 2012/0198528 A1 | 8/2012 | Baumhof |

(Continued)

*Primary Examiner* — Benjamin E Lanier (57) ABSTRACT

Systems and methods for hindering cyber-attacks include: modifying a target website of a remote service provider, wherein modifying the target website includes: reconfiguring a structure of the target website to include a tattler, wherein when the tattler is executed at a non-authorized copy of the target website, the tattler is configured to transmit to a cyber-attack mitigation platform tattler data associated with the non-authorized copy of the target website; receiving the tattler data, wherein the tattler data includes website monitoring data, wherein the website monitoring data comprises a URL of the non-authorized copy of the target website; using the website monitoring data to evaluate the non-authorized copy of the target website, wherein the evaluating includes identifying whether the non-authorized copy of the target website comprises an attack website; and implementing one or more attack mitigation protocols when the non-authorized copy of the target website comprises the attack website.

20 Claims, 4 Drawing Sheets

(56) References Cited

U.S. PATENT DOCUMENTS

| | | |
|---|---|---|
| 2013/0086677 A1 | 4/2013 | Ma et al. |
| 2013/0145462 A1 | 6/2013 | Hsu et al. |
| 2014/0033307 A1 | 1/2014 | Schmidtler |
| 2014/0249873 A1 | 9/2014 | Stephan et al. |
| 2014/0359760 A1 | 12/2014 | Gupta et al. |
| 2015/0052053 A1 | 2/2015 | Howe |
| 2015/0067839 A1 | 3/2015 | Wardman et al. |
| 2015/0178374 A1 | 6/2015 | Rahat et al. |
| 2015/0200963 A1 | 7/2015 | Geng et al. |
| 2015/0264084 A1 | 9/2015 | Kashyap et al. |
| 2015/0304347 A1 | 10/2015 | Smith et al. |
| 2016/0014151 A1 | 1/2016 | Prakash |
| 2016/0055490 A1 | 2/2016 | Keren et al. |
| 2016/0156641 A1 | 6/2016 | Kondapalli et al. |
| 2017/0063923 A1* | 3/2017 | Yang .................. H04L 63/1483 |
| 2017/0070483 A1 | 3/2017 | Sammet et al. |
| 2018/0063190 A1 | 3/2018 | Wright et al. |

\* cited by examiner

METHOD FOR IDENTIFYING PHISHING WEBSITES AND HINDERING ASSOCIATED ACTIVITY

CROSS-REFERENCE TO RELATED APPLICATIONS

This application is a continuation of U.S. application Ser. No. 15/683,358, filed Aug. 22, 2017, which claims the benefit of U.S. Provisional Application No. 62/378,551, filed Aug. 23, 2016, the entire contents of which are incorporated herein by reference.

TECHNICAL FIELD

This invention relates generally to the computer security field, and more specifically to a new and useful method for identifying phishing websites and hindering associated activity.

BACKGROUND

Computer security vulnerabilities come in all shapes and sizes; resultantly, computer security strategy must be varied and diverse to protect against exploitation of those vulnerabilities. Phishing is a particularly interesting challenge for computer security implementation because it is not solely a technological problem, as phishing relies on exploitation of a vulnerability not easily rectified—human weakness.

Attackers commonly perform phishing attacks on organizations by setting up a phishing website that copies an organization's login page (e.g., so that the phishing website is visually similar to the organization's website), where an attacker has access to credentials entered at the phishing website by a victim. After a victim enters credentials, the phishing website often redirects the victim to the organization's website in an attempt to conceal the fact that the victim's credentials were compromised.

Traditional anti-phishing approaches often lack the tools to give organizations insight and visibility into who, when, and how individuals in an organization are phished. While computer network users can be trained to recognize and report phishing attacks, it is difficult for such training to result in sufficient protection before a user's credentials are compromised; after all, only one user's mistake is needed for a phishing attack to succeed.

Thus, there is a need in the computer security field to create new and useful methods for identifying phishing websites and hindering associated activity.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Method for Identifying Phishing Websites and Hindering Associated Activity.

Figure 1:
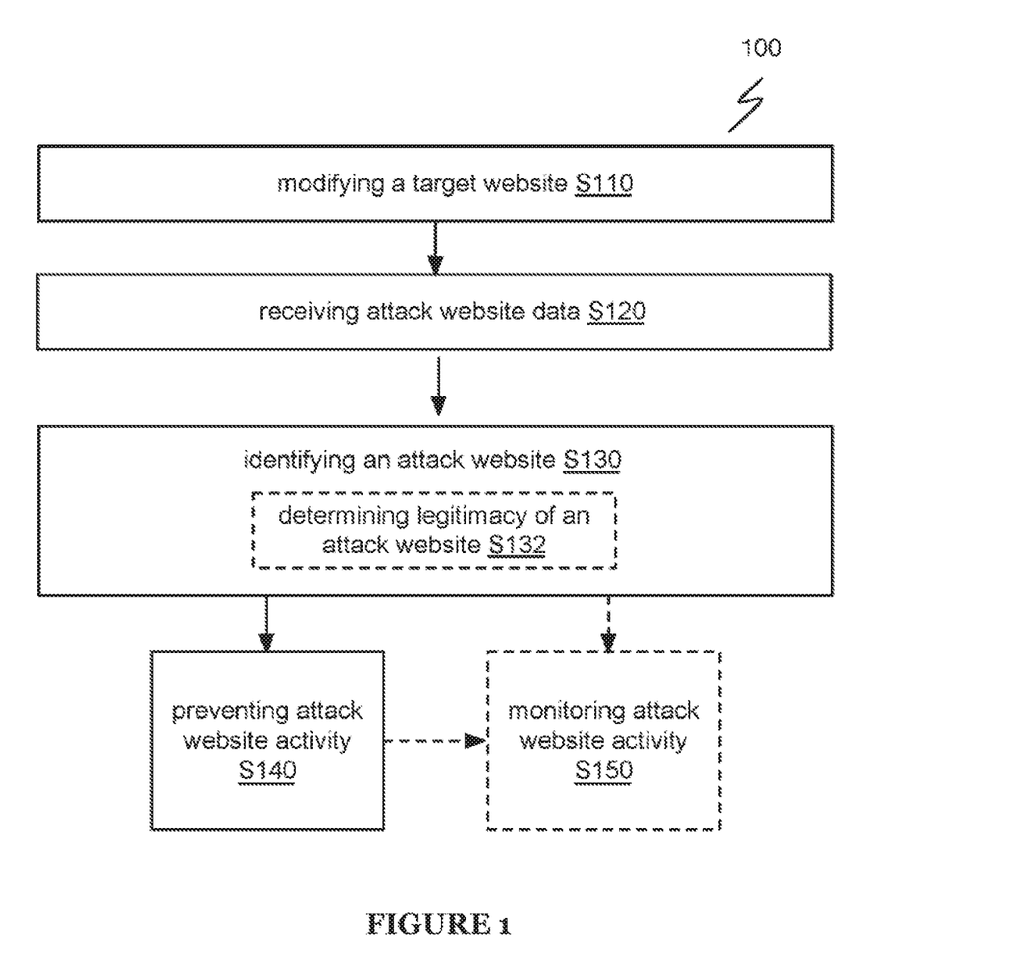
FIG. 1 is a schematic representation of a variation of a method of a preferred embodiment.
Figure 2:
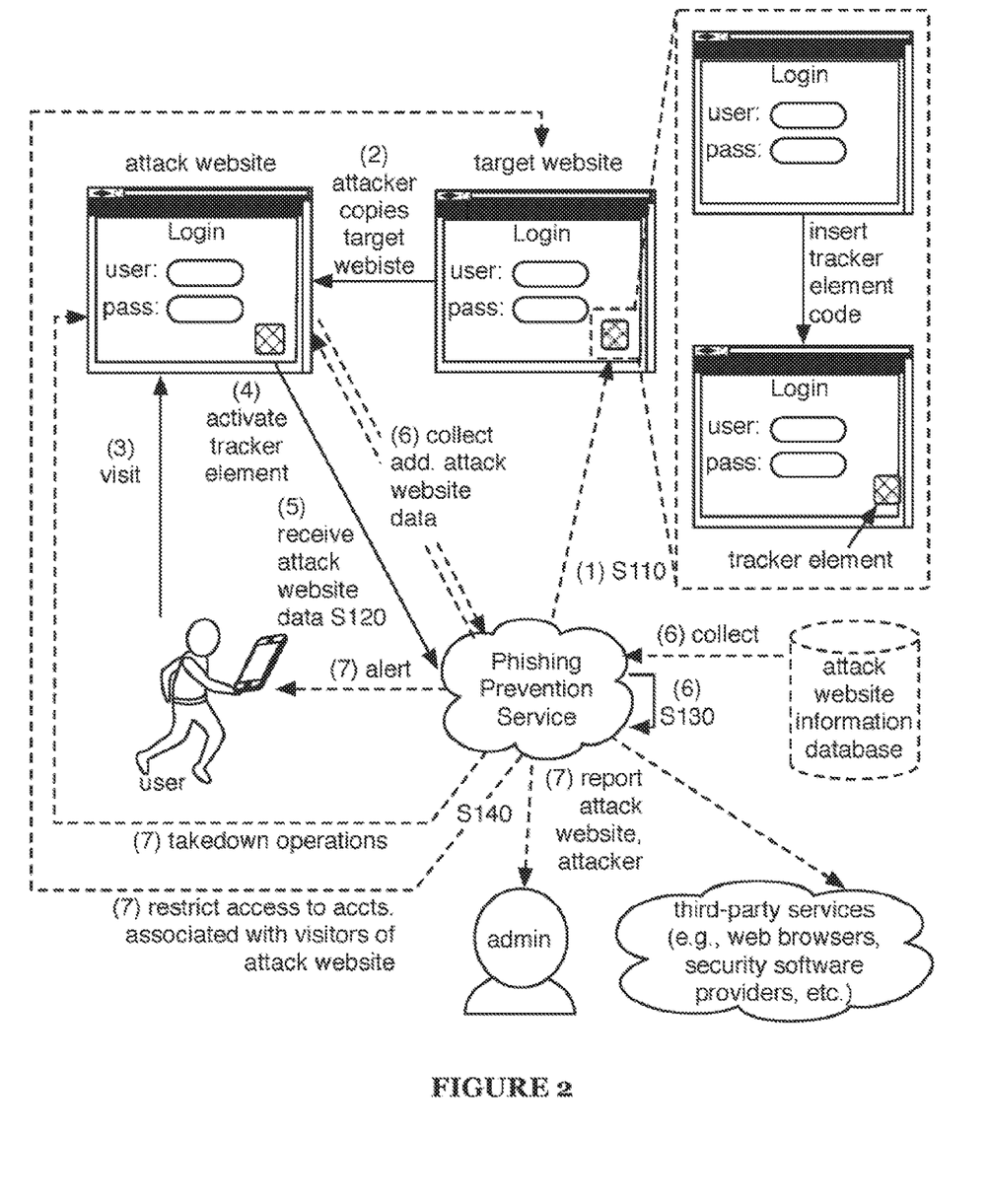
FIG. 2 is a schematic representation of a variation of a method of a preferred embodiment.

As shown in FIGS. 1-2, a method 100 for hindering phishing activity includes modifying a target website S110, receiving tattler data S120, identifying an attack website S130, hindering attack website activity S140. The method 100 can additionally or alternatively include monitoring attack website activity S150.

The method 100 functions to hinder phishing activity through detecting phishing websites and hindering activity associated with the phishing websites. Additionally or alternatively, the method 100 can function to monitor phishing website activity, in order to collect actionable phishing-related data for use in improving security measures.

As shown in FIG. 2, in an example workflow of the method 100, (1) a target website (e.g., a legitimate third-party service website) is modified to include a JavaScript tattler for collecting website monitoring data (e.g., data regarding the attack website, visitors to the attack website, the attacker, etc.); (2) an attacker copies the target website—including the tattler code—in order to setup an attack website (e.g., a phishing website); (3) an individual (e.g., a victim, the attacker, etc.) visits the attack website; (4) the tracker element is activated (e.g., in response to a web browser executing the tracker element code) and begins collecting website monitoring data; (5) collected website monitoring data is transmitted to a phishing hindering service (e.g., a first-party service administering the method 100); (6) the legitimacy of the attack website is evaluated, such as by comparing the similarity of the attack website to the legitimate website indicating a phishing attempt; and (7) in response to identification of the attack website as illegitimate, attack website activity is hindered (e.g., through takedown operations, hindering account access to organization resources, reporting the attack website, etc.). In examples of the method 100 that include a tattler, the tattler preferably includes JavaScript code that collects, analyzes, and/or transmits (e.g., to a remote server associated with an authentication service) website monitoring data when executed. Additionally or alternatively, one or more tattlers can include code in Java, Python, HTML, CSS, PHP, XML, and/or any suitable language.

Figure 3:
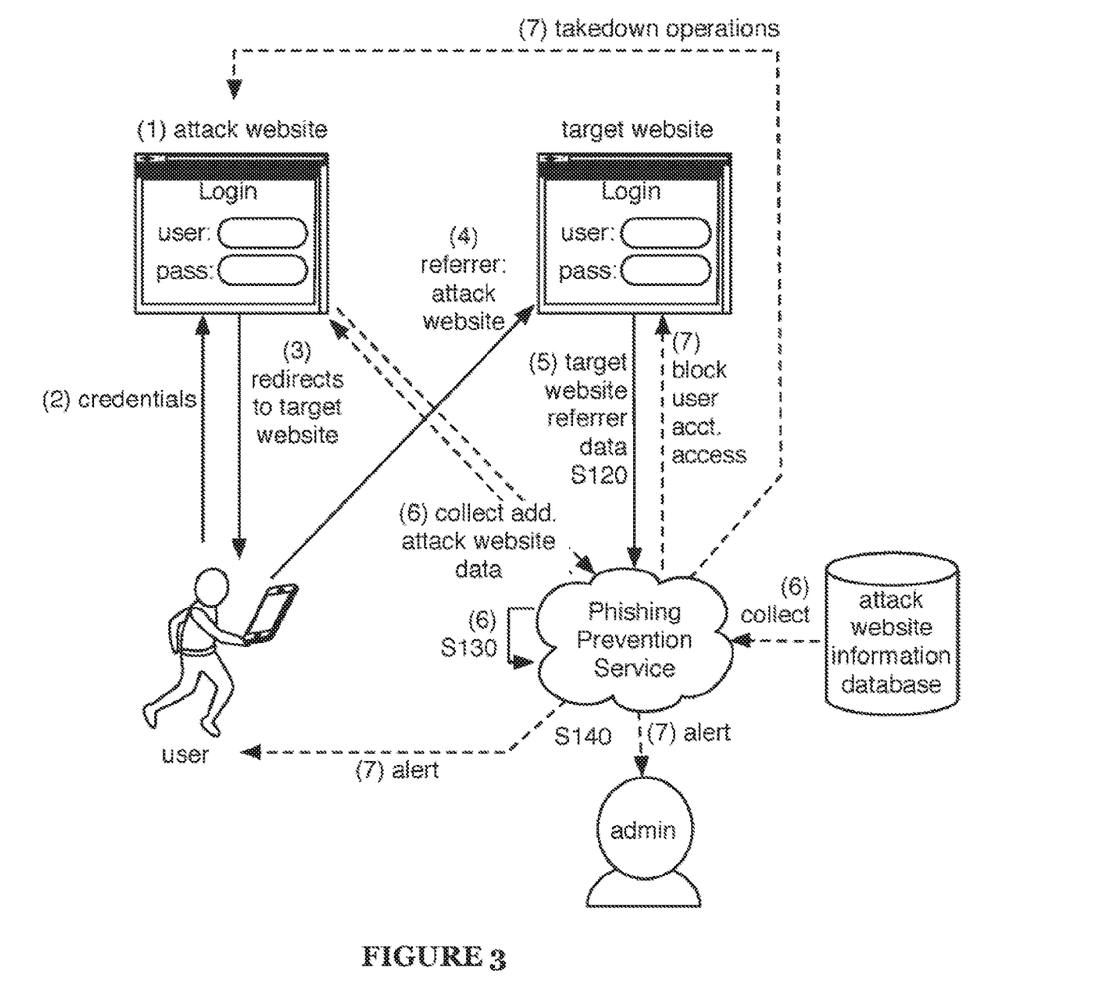
FIG. 3 is a schematic representation of a variation of a method of a preferred embodiment.

As shown in FIG. 3, in another example workflow of the method 100, (1) an attacker sets up an attack website (e.g., by copying the target website code); (2) a victim enters their credentials at the attack website; (3) the attack website redirects the victim's web browser to the target website; (4) the target website receives referrer data indicating information regarding the previous website (e.g., the attack website) that directed the victim to the target website; (5) the phishing hindering service receives the referrer data; (6) the legitimacy of the attack website is evaluated (e.g., by comparing referrer data and/or other website monitoring data with known attack website information); and (7) activity associated with the attack website is hindered.

Additionally or alternatively, portions of the method 100 can be enabled by a web-based software platform operable on a web server or distributed computing system, and/or any suitable computer system capable of identifying phishing websites and hindering associated activity.

1.1 Modifying a Target Website.

As shown in FIGS. 1-2, S110 includes modifying a target website. S110 functions to modify one or more aspects of a target website to enable identification of one or more attack websites.

A target website is preferably a website for which a user seeks protection against phishing attacks. Additionally or alternatively, a target website can be a website for which a service (e.g., the service owning the target website) seeks phishing-related data. Selection of target websites to modify can be received from the third-party service owning the target website (e.g., a third-party service administrator can transmit a request, etc.), automatically selected (e.g., automatically selecting a website that an identified attack website is attempting to mimic), and/or selected in any suitable manner. For instance, a target website may be selected from among a plurality of legitimate websites of a service provider based on a determined susceptibility to phishing attacks. In such instance, the phishing hindering service may function to determine a level of susceptibility to a phishing attack for each of the plurality of legitimate websites. In one embodiment, the target website may be selected based on a probability or a likelihood of a cyber-attack (e.g., phishing) against the target website. In such embodiment, the phishing hindering service may determine a probability or a likelihood of a cyber-attack against the target website. The method 100 may function to implement a machine learning model that is specifically trained to determine a susceptibility of a target website to a cyber-attack as well as predict a probability of a cyber-attack against a target website. Receiving target website selections can be through a website (e.g., a web portal, website form, etc.), an application, an API, e-mail, and/or through any suitable communication means. Additionally, or alternatively, target website selections may be made automatically according to the determined susceptibility or determined likelihood of a phishing attack satisfying a predetermined threshold or the like.

Modifying a target website can include any one or more of: modifying target website code (e.g., JavaScript, Java, Python, HTML, CSS, PHP, XML, etc.) including rewriting one or more portions of the target website code, augmenting the target website code, reconfiguring a structure of the target website code (while injecting a phishing detection code (e.g., injecting tattler code)), configuring a web server (e.g., a web server hosting the target website), modifying settings for website integration services (e.g., integrated web applications, website builders, retail management platforms, website delivery services, website protection services, etc.), and/or any suitable operation. Further, configuring the web server may include configuring the web server with one or more code detection tools or packets that enables the web server to selectively and/or dynamically reconfigure or update target websites hosted thereon with phishing detection mechanisms (e.g., tattler code, etc.)

S110 preferably includes modifying a target website to add a tattler (e.g., a JavaScript tattler section of code) for collecting website monitoring data. The tattler is preferably copied to the attack website, such as when an attacker generates an attack website by copying a target website's code that includes tattler code. Additionally or alternatively, tattlers can be attached to an attack website through website integration services (e.g., attached when an attack website integrates with a website integration service), and/or through any suitable mechanism. As such, S110 can include activating the tattler in response to execution of the tattler code by a user's web browser when a user visits the attack website. Accordingly, S110 may function to enable a conversion of the tattler from an unactivated or dormant state to an activated state based on one or more triggers (including when a web browser executing the target website or copy thereof). In a variation, the tattler can be dynamically injected (e.g., by a content delivery network) into the target website code as it is being served to the user through the user's web browser. In this variation, dynamically injecting the tattler can circumvent the need for an administrator to modify the target website code. The tattler can alternatively collect website monitoring data (e.g., by performing DNS lookups, WHOS lookups, etc.) without attaching to the target website. The tattler can be inserted into a target website automatically (e.g., by receiving modification permissions to code of the target website; and automatically inserting a tattler code snippet into an appropriate section of the target website code), semi-automatically (e.g., by conferring administrators with tools at a web interface for implementing the tattler in the target website), manually (e.g., by prompting administrators to modify their target website code to include tattler code), and/or through any suitable means. In an example, S110 can include automatically generating a tattler code snippet tailored to characteristics of the target website; and prompting a target website administrator and/or other suitable entity to insert the tattler code snippet at an appropriate location. In such example, S110 may include analyzing the target website and determining attributes and characteristics of the target website. S110 may then function to use the attributes and characteristics of the target website to specifically tailor or design (or automatically generate) a tattler code section that can seamlessly integrate with pre-existing code of the target website. Additionally, or alternatively, at a time of fabricating the target website, S110 may function to include a tattler in the original coding structure of the target website.

The tattler preferably collects website monitoring data regarding the attack website to which the tattler is attached. Website monitoring data can include: attack website visitor data (e.g., HTML request data, cookie data, browser data, device data, visitor inputs such as clicks, text entries, etc.), attack website activity (e.g., website traffic, web analytics data, popularity metrics, content data, etc.), domain data (e.g., DNS records, WHOIS records, geographic origin, ownership data, etc.), target website referrer data (e.g., as described in S120), and/or any other suitable data.

The tattler can collect data from: HTTP requests to the attack website, web browser information (e.g., of users visiting the attack website), cookies (e.g., first-party cookies, third-party cookies, etc.), and/or any other suitable sources.

In an example, modifying a target website can include inserting a script (e.g., a JavaScript script) into a target website (e.g., an account login webpage of the target website); and in response to execution of the JavaScript tag by a visitor web browser accessing the attacker website, accessing the HTTP request message associated with the visitor. In this example, the accessed HTTP request message can be recorded and subsequently parsed to determine attack website visitor data (e.g., referrer information, language, browser information, screen resolution, etc.).

In another example, activation of the tattler can result in transmitting one or more HTTP cookies (e.g., a tracking cookie) to the web browser of a visitor visiting the attack website. The HTTP cookie can collect data indicative of: unique visitor information, visitor session time, frequency of visits, timing of visits, and/or other attack website visitor data. In a specific instance of this example, attack website visitor data describing a non-unique visitor with a relatively large frequency and duration of visits may indicate a potential attacker (e.g., the creator of the attack website). As mentioned above, activation of the tattler may function also to collect attack website activity that, in some embodiments, includes user activity while visiting the attack website in which the user activity includes providing user credentials and the like. In the case that the tattler detects a visitor providing credentials to the attack website, the tattler may function to capture the credentials data and specifically, transmit the credentials data in a secure manner. Thus, the tattler may include or have access to encryption functionalities in order to securely transmit the credentials data to the one or more computing servers of the phishing hindering service.

In another example, modifying a target website can include inserting PHP tattler code into a target website. Activation of the PHP tattler can result in tracking visitor click actions (e.g., a visitor clicking on a DOM element of the attack website). In a specific instance of this example, attack website visitor data describing an irregular visitor click pattern relative other visitors (e.g., clicking on DOM elements that other visitors do not click on, clicking on a plurality of DOM elements in a single session, etc.) may indicate a potential attacker (e.g., the creator of the attack website). Accordingly, the click action data may be compared to one or more visitor and/or attacker profiles to determine whether the click action data may be associated with a legitimate visitor or a potential actor. In the instance that it is determined that the click action data may be associated with a potential actor, the phishing hindering service or the like may function to automatically trigger threat mitigation protocols to ameliorate the threat of a cyber-attack or the like by the potential attacker or an affiliate thereof.

In a variation, S110 can additionally or alternatively include obfuscating the target website code. For example, S110 can include obfuscating the inserted tattler code, which can increase the difficulty for an attacker to remove the tattler when copying a target website. Obfuscating the target website code can include one or more of: manual obfuscation (e.g., obfuscation by a human), automatic obfuscation (e.g., with an obfuscator software tool), self-defense mechanisms (e.g., restricting functionality in response to tampering or removal of obfuscated code), encryption, polymorphic obfuscation (e.g., where the obfuscated code changes in response to certain conditions but functionality remains the same), inserting code traps (e.g., controlling when, where, and/or who can execute the obfuscated code or associated applications), minimization, data transformation, register swaps, code merging, binary instruction modification of assembly code (e.g., combination, insertion, substitution, etc.), and/or any other suitable mechanism for deterring attackers from copying target website code and/or removing tracker element code.

In an example of this variation, S110 can include embedding tracker element code in a media file (e.g., image, video, Flash); inserting the embedded tracker element code into the target website; and in response to a web browser loading the media file at an attack website clone of the target website, activating the tracker element.

In another example of this variation, S110 can include integrating tracker element code into a central feature of the target website code, which can require attackers to use the tracker element code in an attack website if the attacker desires the central feature. In each of the above-mentioned variations of S110, the tracker element may function to track a virtual location of the cloned or unauthorized copy of the target website. In such instance, the tracker element may function to generate and transmit a beacon to the phishing hindering service and/or service provider indication location information including one or more of a URL of the cloned target website and a server location of a computing server that is hosting the cloned target website. The beacon may include a transmission of a signal or other indicator . . . . The transmission may be hidden or maintained a secret from the creator of the cloned target website.

In another specific of this variation, S110 can include modifying target website code with polymorphic tracker element code; and in response to satisfaction of a condition (e.g., detection of an HTTP request), transforming the polymorphic tracker element code while maintaining tracking functionality.

In another variation, S110 can include generating digital fingerprints for visitors of the attack website. A digital fingerprint preferably identifies an individual based on web browser data, device data, other website monitoring data, and/or other suitable information associated with the individual. In an example, S110 can include collecting, through one or more HTTP cookies inserted into the web browser of an attack website visitor, web browser data and/or device data associated with the attack website visitor; and generating a digital fingerprint for the attack website visitor from the web browser data and/or device data. Attack website visitor fingerprints can be compared against known attacker digital fingerprints (e.g., in S132) in identifying attackers and/or illegitimate attack websites. Additionally or alternatively, digital fingerprints can be generated and/or compared in any manner described in U.S. application Ser. No. 14/955,377 filed 1 Dec. 2015, which is herein incorporated in its entirety by this reference.

However, S110 can alternatively include modifying a target website in any suitable manner including using a combination of the above-mentioned mechanisms for modifying the target website.

1.2 Receiving Website Monitoring Data.

As shown in FIGS. 1-3, S120 includes receiving website monitoring data. S120 functions to receive data associated with one or more attack websites, in order to gather information for identifying attack websites and/or hindering attack website activity. The website monitoring data may additionally be used in S110 to determine an identity of a potential attacker implementing the attack website.

S120 preferably includes receiving the website monitoring data collected by one or more tattlers (e.g., deployed in S110). Website monitoring data can be received from a remote server (e.g., associated with the third-party service administering the target website in which the tattler is inserted, associated with a first-party service administering the tattler, etc.), an administrator (e.g., through a web interface), a user (e.g., a user submission), and/or any suitable entity. In a variation, tattler code can include code that transmits the collected data to a database storing website monitoring data. Alternatively, website monitoring data can exclude tattler-related data (e.g., can include only target website referrer data). The tattler-related data may also include an indication of whether the tattler included in the target website or cloned copy thereof has been modified or an attempt to modify the tattler has occurred.

In some embodiments, upon receipt of the website monitoring data, S120 functions to quarantine the received website monitoring data. In quarantine, S120 may function to analyze the website monitoring data for any potential malicious devices (e.g., viruses, etc.) that may have been included with the website monitoring data. If a malicious device is detected within the website monitoring data, S120 may function to excise the malicious devices prior to passing the website monitoring data for further analysis.

Figure 4:
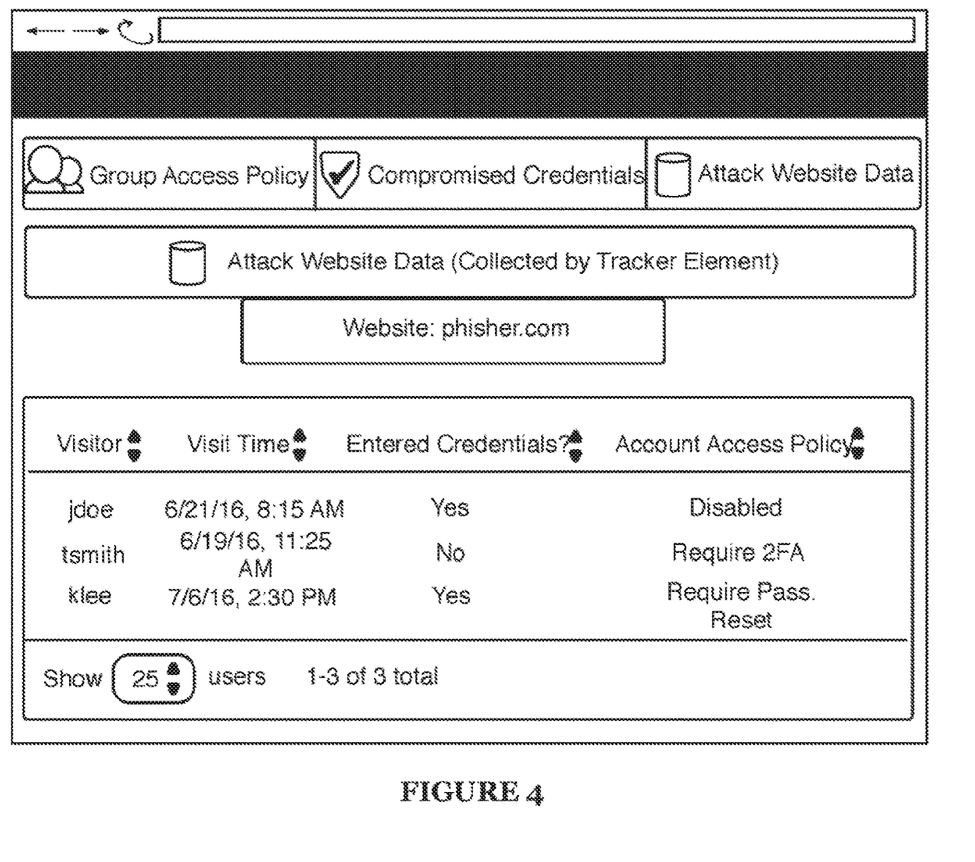
FIG. 4 is an example user interface presenting attack website data in variations of a method of a preferred embodiment.

S120 can include receiving website monitoring data in response to a transmitted request (e.g., to a database storing the collected website monitoring data), automatically at specified time intervals (e.g., every minute, hour, day, etc.), in response to satisfaction of data threshold conditions (e.g., amount of data collected, types of data collected, etc.), and/or at any suitable time. For example, the method 100 can include receiving, in real-time, website monitoring data collected by a tattler; and presenting the website monitoring data at a web interface (e.g., as shown in FIG. 4).

In a variation, website monitoring data can optionally include target website referrer data. Target website referrer data is preferably data regarding a referring webpage that a user visited before reaching the target website. Target website referrer data can include any one or more of: referring webpage URL, referral paths (e.g., webpage URLs that a visitor visited before reaching the referring webpage), HTTP referrer header field, referrer domain data (e.g., DNS records, WHOIS records, geographic origin, ownership data, popularity metrics, content data, etc.), and/or any other suitable referrer data.

In this variation, target website referrer data can be received without modifying the target website (e.g., in S110). For example, a target website can collect target website referrer data from visitors (e.g., from the HTTP referrer header field of the visitor's HTTP request to the target website, etc.), and the target website referrer can be received from the target website (e.g., by requesting the data from the target website, by the target website transmitting the data, etc.). Additionally or alternatively, collecting and/or receiving target website data can be enabled by modifying the target website (e.g., in a manner described in S110). In an example, S120 can include inserting, into the target website, a referrer data monitoring element configured to access referrer data (e.g., accessing and parsing a visitor's HTTP request), record referrer data (e.g., generating a log of a referrer data from visitors), and/or transmit the recorded referrer data (e.g., by uploading the data to a remote server; by transmitting the data in the form of a request, etc.), etc. In another example, the method 100 can include modifying web servers to require referrer information from visitors. In another example, the web server settings associated with the target website can be set to reject HTTP requests lacking the HTTP referrer header field. In another example, the method 100 can include modifying the target website code to log and/or transmit visitor HTTP request information (e.g., HTTP messages containing referrer information) to a first-party (e.g., an authentication service) database.

However, S120 can alternatively include receiving website monitoring data in any manner.

1.3 Identifying a Potential Attack Website

As shown in FIGS. 1-3, S130 includes identifying one or more attack websites. S130 functions to detect one or more potential attack websites usable by an attacker in a phishing attack. S130 can additionally or alternatively classifying one or more potential attack websites S132.

An attack website is preferably a website at-risk of being used in a phishing attack (e.g., to illicitly obtain user credentials). Additionally or alternatively, attack websites can be websites upon which website monitoring data can be collected and/or monitored (e.g., in S110, S150). An attacker may refer to a user or other digital actor that uses unlawful and/or malicious methods to obtain confidential data, misappropriate data (e.g., user credentials, etc.), and the like and, in some embodiments, use this data to perform an attack. The attack by the attacker may include a digital attack or cyber-attack of digital resources and/or accounts.

Potential attack websites can be identified from any one or more of: website monitoring data (e.g., received in S120), attack website information from third-party databases (e.g., aggregators of URLs to potential phishing websites), submissions regarding attack websites and/or attackers (e.g., from reports by a user, an administrator, a security service provider, etc.), attack website activity data monitored in S150, and/or through any suitable information. For example, identifying potential attack websites can include aggregating domain names included in the website monitoring data (e.g., domain names of referrer websites, domain names collected by tattlers, etc.); and filtering out domain names owned by the target website service. In another example, a potential attack website may be identified based on target website referral data indicating a sudden surge in target website visitors originating from a potential attack website with a domain name and website aesthetic that are similar to the target website's domain name and visual characteristics.

In a variation, S130 can include monitoring activity associated with suspicious registered websites corresponding to generated attack domain names (e.g., domain names that are at-risk of being used by an attacker and that have a visual similarity to a target website domain name); and identifying a potential attack website based on the monitored activity. For example, the monitored activity can indicate changes in the visual characteristics (e.g., as indicated by a CSS and/or other style sheet, etc.) of a suspicious registered website to match an aesthetic update in the target website, which may be indicative of an attack website. Additionally or alternatively, S130 can include any elements described in U.S. Provisional Application No. 62/364,745 filed 20 Jul. 2016, which is herein incorporated in its entirety by this reference.

In another variation, S130 may function to identify one or more attack website based at least on the collected website monitoring data. The website monitoring data in such variation may include data about a potential attack website collected by a tattler; however, the website monitoring data may additionally or alternatively include website data collected in response to referrer data collected after a user has been referred to a legitimate target website from a prior potential attack website.

With respect to such variation, S130 may function to use the website monitoring data to determine a likelihood that the potential attack website is, in fact, an attack website that may be used in an attack. Accordingly, S130 may function to analyze the website monitoring data and, in some embodiments, cross-reference the website monitoring data with general web monitoring data collected from various external sources and databases. The general web monitoring data may include data from the dark web and various web-accessible data sources that may include attack data from previously known or discovered attacks by attackers.

Accordingly, the method 100 may use the likelihood that the potential attack website is an attack website to trigger one or more responses to mitigate and/or eliminate the threat posed by the potential attack website. For instance, when the likelihood that the potential attack website satisfies a predetermined attack website threshold, the method 100 may selectively and/or automatically implement one or more threat mitigation protocols.

Additionally, or alternatively, the method 100 may implement a plurality of attack website thresholds defining a continuum or a spectrum where each of the thresholds may trigger a different and/or escalated threat mitigation response to the potential attack website. In such embodiments, the determined likelihood or probability that the potential attack website constitutes an attack website may be compared to the continuum or the spectrum of attack website thresholds to determine which threshold is satisfied and resultantly, the digital threat mitigation protocols to implement.

S130 can alternatively include identifying one or more potential attack websites in any suitable manner.

1.3.A Classifying a Potential Attack Website

As shown in FIGS. 1-3, S130 can optionally include S132, which includes classifying one or more potential attack websites. S132 functions to determine characteristics regarding potential attack website (e.g., evaluating whether the potential attack website is a phishing website).

The legitimacy of an attack website preferably indicates a likelihood that the attack website will be used for phishing purposes. Additionally or alternatively, the legitimacy can indicate the likelihood that the attack website was created by an illegitimate entity (e.g., an entity who has conducted previous phishing attacks), but legitimacy of an attack website can be defined in any suitable manner.

S130 preferably includes classifying potential attack websites from website monitoring data. For example, S130 can include comparing website monitoring data to attack website information databases (e.g., a first-party database maintained by an authentication service, a third-party database maintained by a third-party service, etc.), manually classifying a potential attack website (e.g., with human aid), automatically classifying a potential attack website (e.g., without human intervention), collecting legitimacy information from attack website information third-party databases, receiving legitimacy information submissions (e.g., from a user, an administrator, etc.), and/or any other suitable action.

In a variation, S132 can include generating a comparison between target website data (e.g., visual characteristics, code, media files, etc.) and website monitoring data for a potential attack website; determining a similarity score based on the comparison; and classifying the potential attack website as an attack website in response to the similarity score exceeding a threshold. In an example of this variation, S132 can additionally or alternatively include determining whether the potential attack website attempts to collect credentials (e.g., by analyzing the potential attack website code for text input boxes asking for a username and password), comparing the potential attack website domain name to a list of pre-approved domain names, and/or any other suitable criteria for classifying a potential attack website.

In another variation, S132 can include generating a comparison between potential attack website visitor data and known attack website information (e.g., stored in a first-party database). Generating a comparison preferably evaluates the similarity between features of the potential attack website (e.g., as indicated by visitor data) and features of known attack websites. Additionally or alternatively, generating a comparison can include evaluating the similarity between features associated with a suspected attacker (e.g., the creator of a potential attack website) and features of known attackers (e.g., known creators of phishing websites). In an example, S132 can include comparing a visitor digital fingerprint (e.g., collected by a tattler in S110) and digital fingerprints of known attackers. In this variation, generating a comparison can include generating a similarity metric between the constituents of the comparison. A potential attack website can be identified as an attack website in response to the similarity metric exceeding a threshold. S132 can alternatively include generating a comparison in any fashion.

In another variation, S132 can include classifying a potential attack website based on target website referrer data. For example, S132 can include generating a similarity metric between a referrer domain name (e.g., the domain name of the website that redirected a visitor to the target website) and the potential attack website domain name; and classifying a potential attack website as suspicious in response to the similarity metric exceeding a threshold. S132 can optionally include extracting referrer features from the aggregated target website referrer data (e.g., collected over time and including a set of target website referrer entries), such as patterns of referrers over time, frequency of a given referrer over time, unique referrers over a period of time, and/or other suitable referrer features. In an example, referrers directly linking to a target website account login page may indicate higher likelihood of an attack website. In another example, irregular referrer data for a particular referrer (e.g., infrequent surges in visitors from the referring webpage) may indicate a higher likelihood of an attack website. S132 can alternatively include determining classifying a potential attack website based on target website referrer data in any manner.

In another variation, S132 can include manually (e.g., involving human intervention) classifying a potential attack website. In this variation, S132 can involve guiding an individual (e.g., a security expert) to the potential attack website; and receiving an analysis of the legitimacy of the potential attack website by the individual. Additionally or alternatively, S132 can include guiding an individual through an analysis of the potential attack website (e.g., by providing a checklist of things to look for at the potential attack website); and transforming the analysis into inputs for a attack website identification model for evaluating a potential attack website. S132 can alternatively include manually classifying a potential attack website in any manner.

In another variation, S132 can include automatically (e.g., without human intervention) classifying a potential attack website. In examples, the method 100 can include inserting tattler code into a target website, wherein the tattler code maintains one or more target website identifiers (e.g., a copy of the target website's code, a copy of a section of target website code that is likely to be modified by an attacker, media files associated with the target website, etc.) collected over time; in response to execution of the tattler code (e.g., at the target website, at a potential attack website that copied the target website code, etc.), generating a comparison between the one or more target website identifiers and at least one identifier of the current website to which the tattler is attached; in response to detecting a mismatch between a target website identifier and a current website identifier, classifying the potential attack website as an attack website. However, generating comparison between website identifiers can be performed in any manner.

In this variation, automatically classifying a potential attack website can include generating one or more models for distinguishing between non-attack websites and attack websites. A attack website identification model is preferably generated from attack website features. Attack website features can be extracted from website monitoring data (e.g., collected in S110), attack website activity (e.g., monitored in S150), and/or any suitable data. Attack website features can include: URL features (e.g., favicon, host name, URL shortening usage, similarity to target domain name, subdomain, top level domain, URL length, HTTPS existence, etc.), domain features (domain registration duration, age of domain, domain name owner, associated domain registrar, website traffic, DNS records, WHOIS records, etc.), website code features (e.g., presence of website forwarding, pop-up window usage, iFrame redirection, similarity of code to target website code, etc.), website content features (e.g., hyperlinks to target website, hyperlinks to non-target websites, media content, text input fields, aesthetic similarity to target website, etc.), attack website visitor features (e.g., IP address, visit time, session duration, etc.), and/or any other suitable attack website features. In an example, S132 can include generating a machine learning classifier model that outputs whether a website is an attack website or a non-attack website, and/or outputs a ranking (e.g., a score of 1-10) of the legitimacy of the website. Additionally or alternatively S132 can include generating legitimacy models possessing any probabilistic properties, heuristic properties, deterministic properties, and/or any other suitable properties for determining legitimacy of a website. S132 can alternatively automatically evaluate legitimacy in any manner.

However, S132 can determine legitimacy of an attack website in any fashion.

1.4 Hindering Attack Website Activity

As shown in FIGS. 1-3, S140 includes hindering attack website activity. S140 functions prohibit activity stemming from one or more attack websites and/or potential attack websites.

Attack website activity can include any one or more of: website functionality (e.g., web hosting, etc.), e-mail activity (e.g., originating from the attack website), web browser activity (e.g., browser domain name block lists, etc.), activity relating to services integrated with the attack website (e.g., integrated web applications, website builders, retail management platforms, website delivery services, website protection services, etc.), database activity, and/or any suitable attack activity that can be hindered.

Hindering attack website activity can include any one or more of: implementing takedown operations (e.g., for shutting down the attack website), restricting activity through an authentication service, reporting the attack website and/or attacker (e.g., to security service providers, web browser providers, attack website information databases, services integrated with the attack website, etc.), notifying a suitable entity (e.g., an administrator, a user, etc., at a web interface, application, and/or other suitable venue), and/or any other action. Implementing takedown operations can include reporting the attack website to entities capable of hindering traffic to the website, including any one or more of: a domain name registrar (e.g., by suspending the attack website), hosting provider (e.g., by removing the attack website from the hosting space), DNS provider (e.g., by deleting DNS zones for the attack website), ISP (e.g., by restricting Internet traffic to the attack website), law enforcement, and/or other suitable entity.

In a variation, S140 can include restricting activity through an authentication service. For example, the method 100 can include, receiving, through an authentication service, an access request to a user account from a user who is referred from an attack website; determining a user account identifier (e.g., an account username, IP address, etc.) from the user access request, wherein the user account identifier corresponds to the user account; and modifying user account access (e.g., presenting warnings that the account may be compromised, requiring multi-factor authentication, locking the account, etc.) to the user account through implementing one or more account access polices with the authentication service. In another example, S140 can include identifying a successful access request to a user account from a user who is referred from an attack website, collecting user account identifier information corresponding to the user account; comparing the user account identifier information to known identifier information regarding user accounts associated with the service; identifying the user account based on the comparison; and restricting access to the user account. In another example, an authentication service can compare attacker information (e.g., collected in S110) to information regarding an individual requesting access to the service. In this example, the access request can be handled (e.g., denied) according to the degree to which the attacker's information matches the requester's information (e.g., for a substantially similar match). Additionally or alternatively, restricting activity with an authentication service can include any elements described in U.S. application Ser. No. 13/647, 166 filed 8 Oct. 2012, which is incorporated in its entirety by this reference.

S140 preferably includes hindering activity associated with attack websites identified as illegitimate (e.g., in S132), but activity can be hindered for any suitable website. In a variation, different attack website activity hindering measures can be implemented for different attack websites. For example, S140 can include initiating takedown operations for an attack website identified as illegitimate (e.g., in S132), and reporting the attack website to web browsers for warning visitors of an attack website identified as suspicious.

S140 can alternatively include hindering attack website activity in any manner.

1.5 Monitoring Attack Website Activity

As shown in FIG. 1, the method 100 can additionally or alternatively include monitoring attack website activity S150. S150 functions to collect data associated with attack website activity, for presentation to a suitable entity (e.g., an administrator), determination of the legitimacy of the attack website (e.g., in S132), and/or hindrance of attack website activity (e.g., in S140). For example, monitored attack website activity can include data indicating potentially compromised accounts, which can be presented to administrators for guidance in restricting account access.

Monitoring attack website activity can include any one or more of: recording access request data through an authentication service used by the target website, tracking attack website visitor activity (e.g., through a tattler in S110, etc.), monitoring e-mail activity (e.g., through requesting data from a message transfer agent), collecting DNS activity data (e.g., through periodic DNS lookups, etc.), collecting attack website popularity data (e.g., based on search engine results for the attack website, etc.), retrieving logs, files, and/or other data associated with the attack website and/or attacker (e.g., retrieving from associated domain name registrars, hosting providers, DNS providers, ISPs, etc.), and/or any other suitable mechanism. In examples where a tattler (e.g., a JavaScript tattler) is used to collect attack website activity data, S150 can include detecting insertion of the tattler into an attack website (e.g., through the tattler detecting modified website code when executed); activating the tattler in response to detecting the insertion into an attack website; and collecting a first subset of website activity data with the tattler in the activated state. In these examples, a tattler can collect different types of data depending on whether the tattler is in an activated state (e.g., collecting website visitor activity data when the tattler is executed in an attack website) versus when the tattler is in a deactivated state (e.g., omitting website visitor activity data collection when the tattler is executed in the target website).

In a variation, monitoring attack website activity can include recording access request data with an authentication service. Access request data preferably describes aspects of access requests associated with one or more services of the target website. Access request data can include requester data (e.g., device information, browser information, digital fingerprint, etc.), associated account data (e.g., credentials, permission levels, account preferences, associated security policies, etc.), request data (e.g., time of request, number of requests, authentication data, etc.), and/or other suitable data related to authentication of an access request.

S150 preferably includes recording access request data for potential phishing attack victims. Potential phishing attack victims (e.g., a visitor to the attack website) can be identified through attack website visitor data (e.g., if the potential phishing attack victim possesses an IP address that matches an attack website visitor IP address collected by a tattler in S110), target website referrer data (e.g., if the access requester was redirected to the target website from the attack website, as indicated by referrer data collected in S120), other monitored attack website activity data, and/or any other suitable data.

S150 further preferably includes recording access request data for an attacker (e.g., if the attacker attempts to use compromised credentials in accessing services associated with the target website). An attacker can be identified through comparing requester data (e.g., a digital fingerprint) to known attacker data, but attackers can alternatively be identified in any manner.

Additionally or alternatively, attack website activity (e.g., e-mail activity associated with the attack website domain name) can be monitored in any manner described in U.S. Provisional Application No. 62/364,745 filed 20 Jul. 2016. S150 can alternatively include monitoring attack website activity in any manner.

The method of the preferred embodiment and variations thereof can be embodied and/or implemented at least in part as a machine configured to receive a computer-readable medium storing computer-readable instructions. The instructions are preferably executed by computer-executable components preferably integrated with a system for identifying phishing websites and hindering associated activity. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   upon execution of a tattler code at a non-authorized copy of a target website, detecting by the tattler code that the tattler code has been inserted at the non-authorized copy of the target web site;
   activating the tattler code in response to the detecting, resulting in activated tattler code;
   initiating collection of tattler data by the activated tattler code at the non-authorized copy of the target website; and
   transmitting the tattler data by the activated tattler code, wherein the tattler data is to be received by a phishing hindering service.

2. The method of claim 1, wherein the tattler data comprises website monitoring data.

3. The method of claim 2, wherein the web site monitoring data comprises at least one of:
   visitor activity data of the non-authorized copy of the target website;
   activity data associated with the non-authorized copy of the target website; and
   domain data with associated the non-authorized copy of the target website.

4. The method of claim 1, further comprising:
   tracking, by the activated tattler code, a virtual location of the non-authorized copy of the target website.

5. The method of claim 4, further comprising:
   generating a beacon by the activated tattler code, wherein the beacon comprises location information associated with the non-authorized copy of the target website.

6. The method of claim 1, wherein the transmitting is performed in response to receiving by the tattler code a request to transmit the tattler data.

7. The method of claim 1, wherein the transmitting is performed in response to satisfaction of a condition.

8. The method of claim 7, wherein the condition is at least one of:
   a time of day;
   a time interval;
   a threshold amount of tattler data collected by the activated tattler code; and
   a type of tattler data collected by the activated tattler code.

9. The method of claim 1, further comprising:
   transmitting, by the activated tattler code, one or more tracking cookies to a web browser of a visitor of the non-authorized copy of the target website.

10. The method of claim 1, wherein the tattler data is transmitted to at least one of a server and a database prior to receipt of the tattler data by the phishing hindering service.

11. One or more non-transitory computer readable storage media encoded with instructions that, when executed by a processor, cause the processor to perform operations, comprising:
    upon execution of a tattler code at a non-authorized copy of a target website, detecting by the tattler code that the tattler code has been inserted at the non-authorized copy of the target web site;
    activating the tattler code in response to the detecting, resulting in activated tattler code;
    initiating collection of tattler data by the activated tattler code at the non-authorized copy of the target website; and
    transmitting the tattler data by the activated tattler code, wherein the tattler data is to be received by a phishing hindering service.

12. The media of claim 11, wherein the tattler data comprises website monitoring data comprising at least one of:
    visitor activity data of the non-authorized copy of the target website;
    activity data associated with the non-authorized copy of the target website; and
    domain data with associated the non-authorized copy of the target website.

13. The media of claim 11, wherein the instructions, when executed by the processor, cause the processor to perform further operations, comprising:
    tracking, by the activated tattler code, a virtual location of the non-authorized copy of the target website.

14. The media of claim 13, wherein the instructions, when executed by the processor, cause the processor to perform further operations, comprising:

generating a beacon by the activated tattler code, wherein the beacon comprises location information associated with the non-authorized copy of the target website.

15. The media of claim 11, wherein the instructions, when executed by the processor, cause the processor to perform further operations, comprising:
  transmitting, by the activated tattler code, one or more tracking cookies to a web browser of a visitor of the non-authorized copy of the target website.

16. A system, comprising:
  a memory; and
  a processor configured to:
    upon execution of a tattler code at a non-authorized copy of a target website, detect by the tattler code that the tattler code has been inserted at the non-authorized copy of the target web site;
    activate the tattler code based on detecting that the tattler code has been inserted at the non-authorized copy of the target website, resulting in activated tattler code;
    initiate collection of tattler data by the activated tattler code at the non-authorized copy of the target website; and
    transmit the tattler data by the activated tattler code, wherein the tattler data is to be received by a phishing hindering service.

17. The system of claim 16, wherein the tattler data comprises website monitoring data comprising at least one of:
  visitor activity data of the non-authorized copy of the target website;
  activity data associated with the non-authorized copy of the target website; and
  domain data with associated the non-authorized copy of the target website.

18. The system of claim 16, wherein the processor is further configured to:
  track, by the activated tattler code, a virtual location of the non-authorized copy of the target website.

19. The system of claim 18, wherein the processor is further configured to:
  generate a beacon by the activated tattler code, wherein the beacon comprises location information associated with the non-authorized copy of the target website.

20. The system of claim 16, wherein the processor is further configured to:
  transmit, by the activated tattler code, one or more tracking cookies to a web browser of a visitor of the non-authorized copy of the target website.

* * * * *

UNITED STATES PATENT AND TRADEMARK OFFICE
CERTIFICATE OF CORRECTION

PATENT NO. : 11,057,427 B2
APPLICATION NO. : 16/669935
DATED : July 6, 2021
INVENTOR(S) : Wright et al.

It is certified that error appears in the above-identified patent and that said Letters Patent is hereby corrected as shown below:

In the Claims

Claim 1, Column 13, Line 55, please replace "web site;" with --website;--

Claim 3, Column 13, Line 66, please replace "web site;" with --website;--

Claim 11, Column 14, Line 40, please replace "web site;" with --website;--

Claim 16, Column 15, Line 16, please replace "web site;" with --website;--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*